(12) United States Patent
Pichetti et al.

(10) Patent No.: US 7,490,322 B2
(45) Date of Patent: Feb. 10, 2009

(54) SOFTWARE DISTRIBUTION METHOD AND SYSTEM

(75) Inventors: Luigi Pichetti, Rome (IT); Claudio Marinelli, Latina (IT)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 10/510,547

(22) PCT Filed: Feb. 13, 2003

(86) PCT No.: PCT/EP03/02300

§ 371 (c)(1),
(2), (4) Date: Oct. 7, 2004

(87) PCT Pub. No.: WO03/085513

PCT Pub. Date: Oct. 16, 2003

(65) Prior Publication Data

US 2005/0149925 A1     Jul. 7, 2005

(30) Foreign Application Priority Data

Apr. 11, 2002   (EP)   ................................. 02368036

(51) Int. Cl.
*G06F 9/44*   (2006.01)
*G06F 15/177*   (2006.01)

(52) U.S. Cl. .................. 717/170; 717/177; 713/100; 709/221

(58) Field of Classification Search ................. 717/170, 717/177
See application file for complete search history.

(56) References Cited

U.S. PATENT DOCUMENTS 5,361,360 A   11/1994   Ishigami et al.
2002/0010910 A1   1/2002   Marinelli et al.

FOREIGN PATENT DOCUMENTS

EP   0999496   10/2000
WO   WO9425924   10/1994

*Primary Examiner*—Eric B Kiss
(74) *Attorney, Agent, or Firm*—Duke W. Yee; Jeffrey S. LaBaw; Wayne P. Bailey

(57) ABSTRACT

A software distribution method and system are provided. In a software distribution application, packages including instructions specifying the actions to be carried out on each target computer for installing or removing selected software products are prepared in a central site. Each package is transmitted to the target computer, and the corresponding instructions are interpreted so as to enforce the desired software products meeting the current configuration of the target computer. The configuration of the target computer is monitored to detect any hardware upgrade. In response thereto, the target computer generates a list of actions for removing software products not meeting the new configuration any longer and a list of action for installing software products now meeting the new configuration. These lists are transmitted to the central site, and they trigger the building of a delta package. The delta package is then distributed to the target computer.

4 Claims, 6 Drawing Sheets

SOFTWARE DISTRIBUTION METHOD AND SYSTEM

TECHNICAL FIELD

The present invention relates to the data processing field, and more specifically to a software distribution method and corresponding system.

BACKGROUND ART

Distribution of software features (such as new software products) is a time consuming activity, particularly in a system including a great number of target computers to which the software products must be distributed. For example, this is a commonplace activity in large organizations embracing thousands of workstations, where software products are periodically upgraded in order to be abreast of the information technology development or to comply with organizational changes.

Software distribution applications have been proposed in the last years to assist a system administrator in efficiently managing deployment of software products from a central site of the system. A software distribution application controls building of packages including instructions specifying the actions to be carried out on the target computers for installing or removing selected software products; each package further embeds a copy of the software products to be installed on the target computers. The package is transmitted to each target computer, and the corresponding instructions are interpreted so as to enforce the desired software products.

In order to increase flexibility of the software distribution application, the instructions are typically conditioned to a configuration of the target computer (for example, defined by a series of hardware parameters). The package is then made generic for target computers having different hardware configurations so as to require less maintenance on the part of the system administrator.

The software distribution applications known in that art are based on an enforcement model, wherein all the operations are managed from the central site of the system; no kind of cooperation between the central site and the target computers is supported. This lack of cooperation brings about inconsistencies in several scenarios.

Particularly, hardware upgrades of the target computer may change the result of the evaluation of the conditions defined in the package; in other words, conditions that were true at the distribution time may become false, and vice-versa. As a consequence, the software products installed on the target computer are not consistent with its hardware configuration any longer. At best, the hardware resources of the target computer are under-exploited. However, these inconsistencies may cause run-time errors (for example, due to missing memory allocation); at worst, they may impair operation of the whole target computer (for example, when the version of the software products installed on the target computer is incompatible with its hardware).

These drawbacks are particularly acute in high dynamic environments, wherein the hardware configuration of the target computers changes frequently.

SUMMARY OF THE INVENTION

It is an object of the present invention to provide a software distribution method and a corresponding system, which support some sort of cooperation between the central site and the target computers.

It is another object of the present invention to avoid inconsistencies in the target computers.

It is yet another object of the present invention to ensure that operation of the target computer is not impaired by software features incompatible with its configuration.

The accomplishment of these and other related objects is achieved by a software distribution method including the steps of: on a source computer providing a package including an indication of actions to be performed on each one of a plurality of target computers for enforcing corresponding software features, at least one of the actions being conditioned to a configuration of the target computer, transmitting the package from the source computer to the target computer, performing the actions meeting the configuration of the target computer, detecting a change resulting in a new configuration of the target computer, determining correction actions for enforcing the software features meeting the new configuration, and performing the correction actions.

The present invention also provides a computer program application for performing the method, and a product storing the program application. Furthermore, the invention provides a corresponding software distribution system.

In accordance with one aspect of the invention, there is provided a computer program directly loadable into a working memory of a target computer for performing a software distribution method when the program is run on the target computer, wherein the target computer is coupled with a source computer providing a package including an indication of actions to be performed on the target computer for enforcing corresponding software features and wherein at least one of the actions is conditioned to a configuration of the target computer, the method including the steps of: receiving the package from the source computer, performing the actions meeting the configuration of the target computer, detecting a change resulting in a new configuration of the target computer, determining correction actions for enforcing the software features meeting the new configuration, and performing the correction actions.

The present invention also provides a product storing the program, and a corresponding target computer for use in a software distribution system.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

Figure 1A:
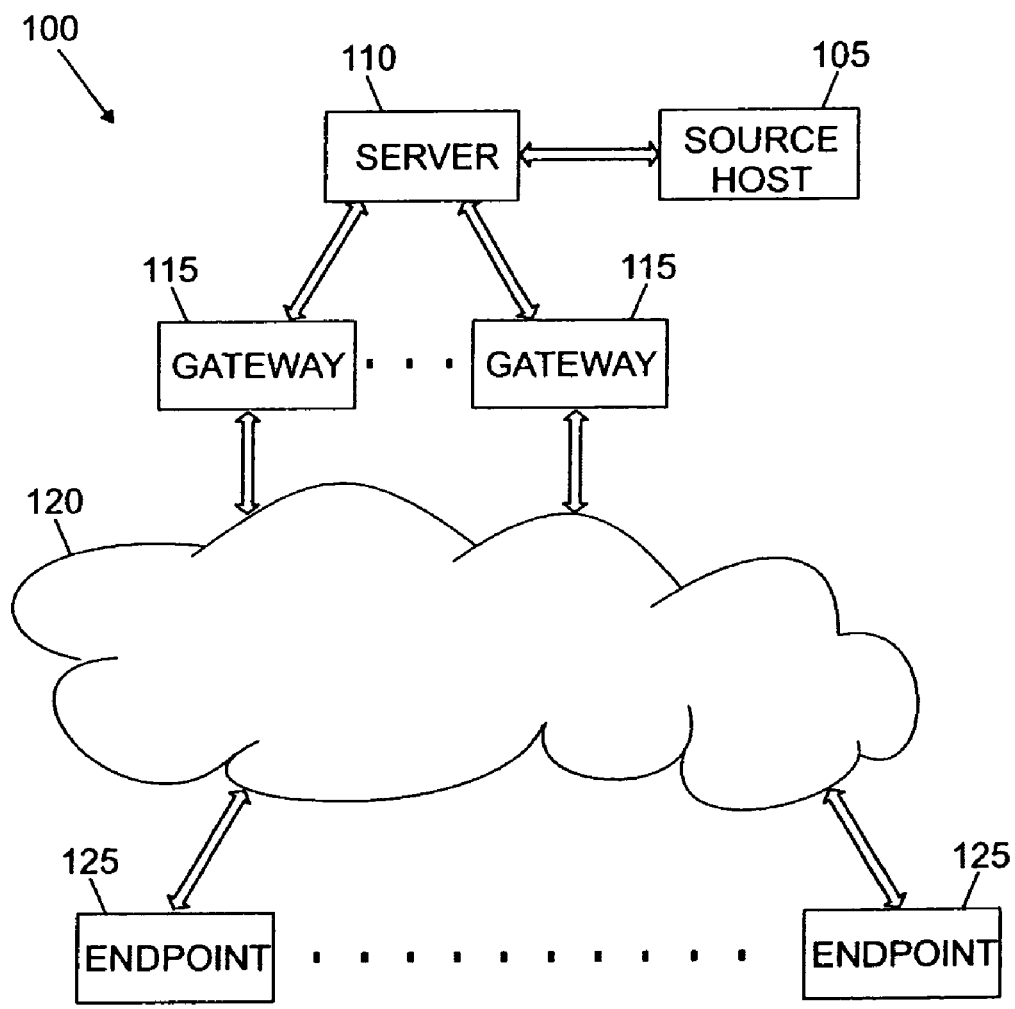
FIG. 1a is a schematic block diagram of a system in which the method of the invention can be used.

With reference in particular to FIG. 1a, a data processing system 100 with a distributed architecture is shown. A host computer 105 operates as a preparation and testing central site for software products to be distributed throughout the system 100. The (source) host 105 is connected to a server computer 110, which manages a software distribution process. One or more gateway computers 115 couple the server 110 with a network infrastructure 120, typically INTERNET-based. Multiple endpoint computers 125 access the network infrastructure 120; each endpoint 125 defines a target of the software distribution process.

The endpoint 125 communicates with a corresponding gateway 115 via a peer-to-peer protocol, such as the TCP/IP. Communication between the server 110 and the gateway 115 is established via an ORB, which is a component in the CORBA programming model acting as a middleware between servers and clients. Each endpoint 125 is accessed by the server 110 through a corresponding object on the associated gateway 115, thus enabling the endpoint 125 to be directly addressed by the server 110. In this way, the server 110 may call methods on applications resident on the endpoint 125.

Figure 1B:
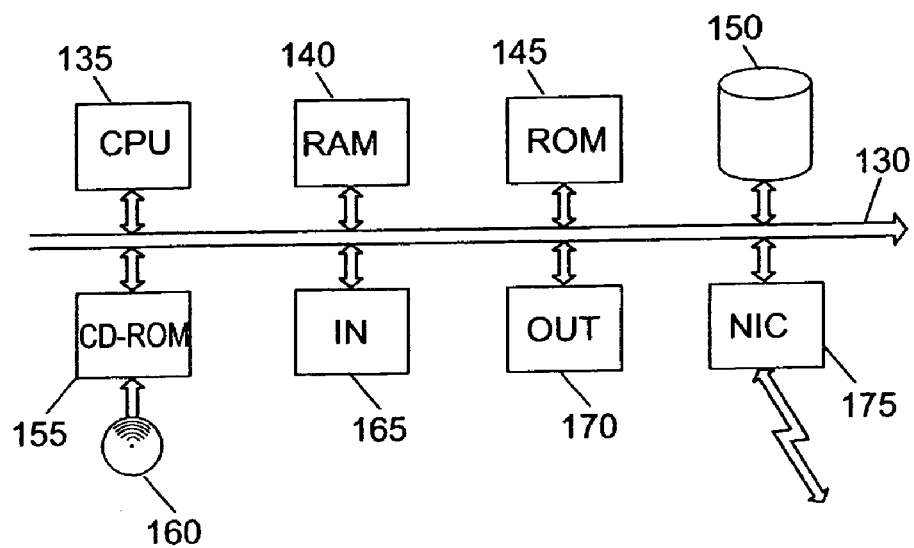
FIG. 1b depicts the functional blocks of a generic computer of the system.

As shown in FIG. 1b, a generic computer of the system is formed by several units that are connected in parallel to a communication bus 130. In detail, a central processing unit (CPU) 135 controls operation of the computer, a RAM 140 is directly used as a working memory by the CPU 135, and a ROM 145 stores basic programs for a bootstrap of the computer. Several peripheral units are further connected to the bus 130 (by means of respective interfaces). Particularly, a bulk memory consists of a magnetic hard-disk 150 and a driver 155 for reading CD-ROMs 160. Moreover, the computer includes input devices 165 (for example, consisting of a keyboard and a mouse), and output devices 170 (for example, consisting of a monitor and a printer). A NIC 175 is used to control network communication.

Similar considerations apply if the system has another topology, if two or more source hosts and/or servers are provided, if the source host and the server are combined in a single computer, if the endpoints are coupled with the server in a different way, if equivalent source and target computers are provided, if the computers have a different structure or include different units, and the like.

Figure 2A:
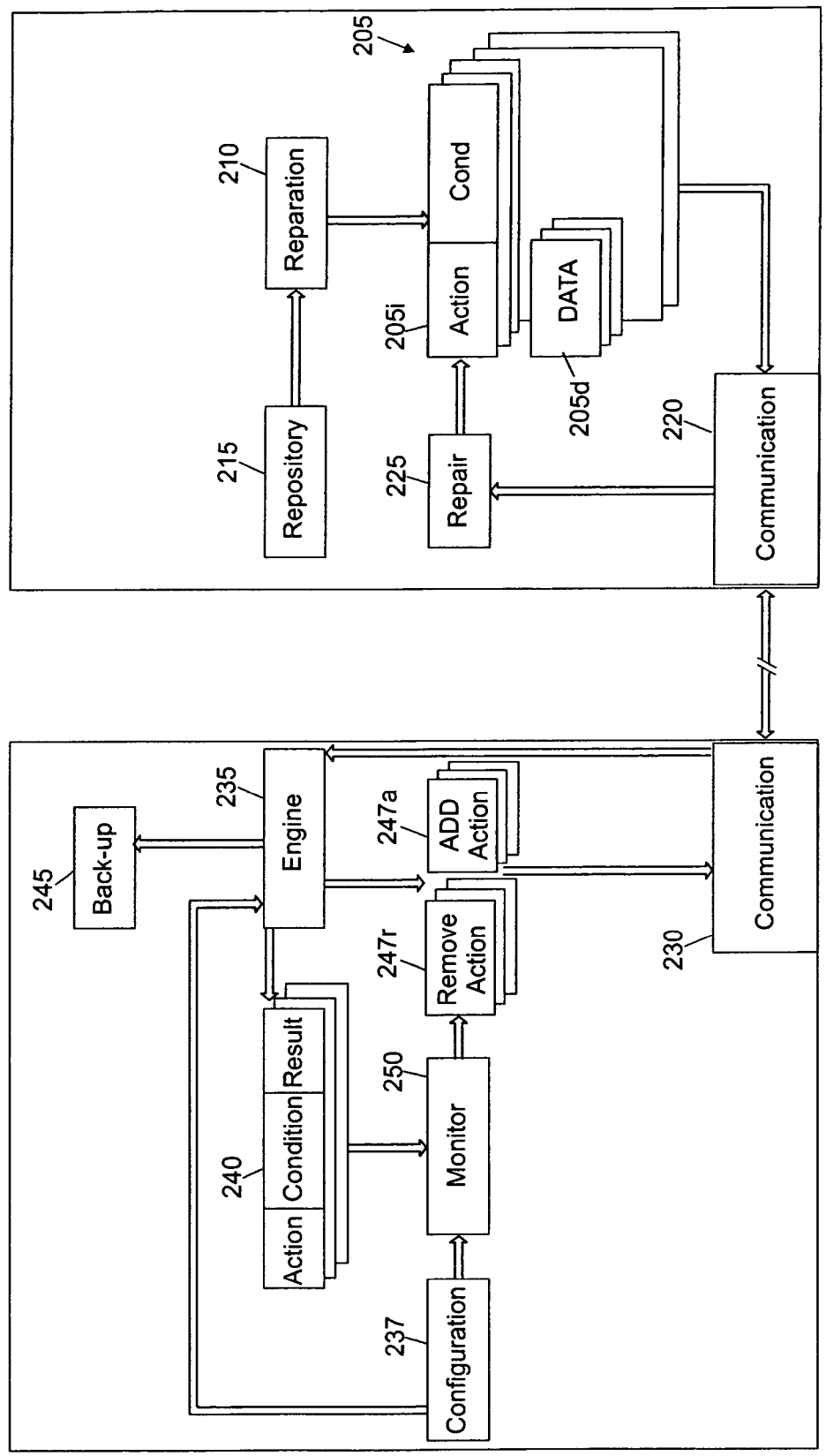
FIG. 2a shows a partial content of the working memories of a source host and of an endpoint of the system.

Considering now FIG. 2a, a partial content of the working memories of the source host and of a generic endpoint is shown; the information (programs and data) is typically stored on the respective hard-disks and loaded (at least partially) into the working memories when the programs are running, together with an operating system and other application programs (not shown in the figure). The programs are initially installed onto the hard disks from CD-ROMs.

Particularly, the source host stores packages 205 that are used to distribute software products to the endpoints. Each package 205 consists of an instruction section 205i and a data section 205d. The data section 205d embeds the entities to be installed on each endpoint, whereas the instruction section 205i comprises the definition of a series of actions to be carried out on the endpoint; each action is associated with a possible condition, which specifies when the action can be performed.

Figure 2B:
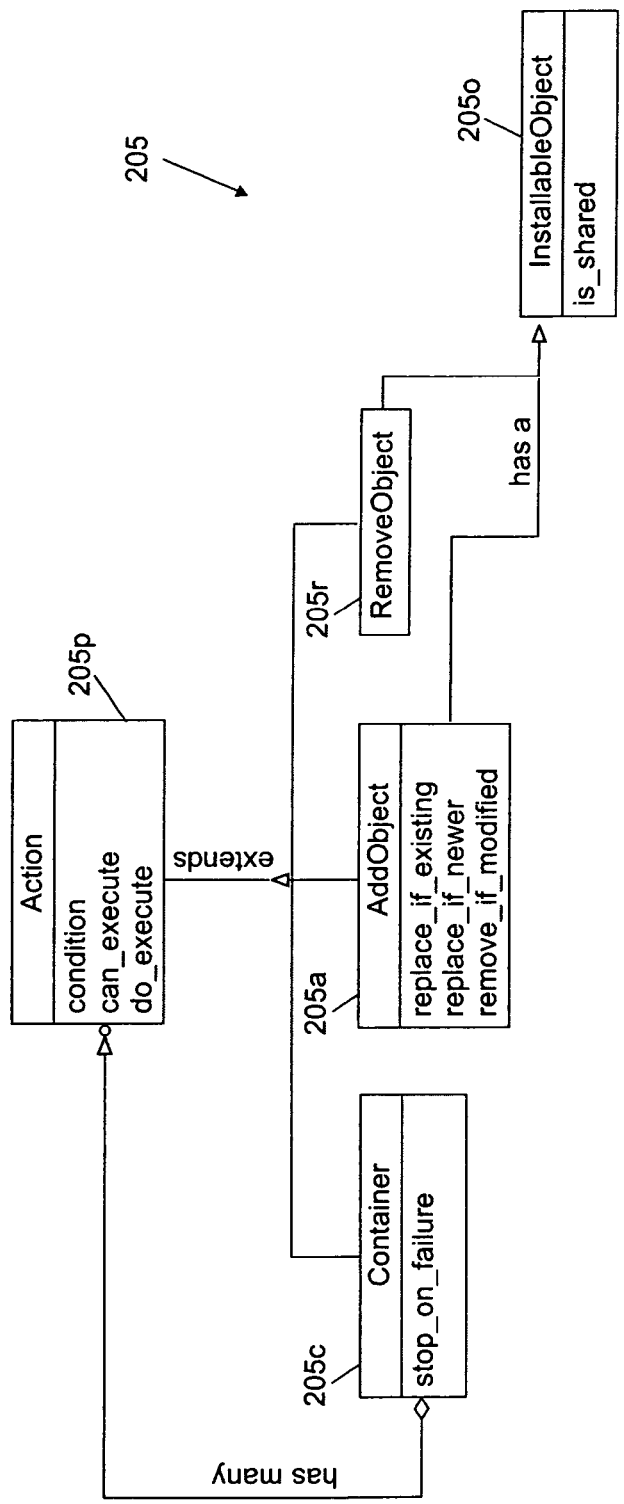
FIG. 2b depicts the hierarchical structure of a package employed in a software distribution process.

More specifically, as shown in FIG. 2b, the package 205 is logically organized into a hierarchical structure starting from a root node. Each leaf node of the hierarchical structure corresponds to an action. Some actions are self-contained, whereas other actions take a subject referred to as an installable object; installable objects are entities to be added to or to be removed from the endpoint. For example, self-contained actions specify the restart of the endpoint, whereas actions with installable objects specify adding or removal of a file, of an icon, and the like. Branch nodes of the hierarchical structure consist of containers that comprise collections of child actions sharing the default of the container.

Each node of the hierarchical structure causes a class to be instantiated. Actions without any installable object (to be added or to be removed) correspond with classes that extend a generic ACTION class 205p. The ACTION class 205p exposes a series of attributes, which specify the conditions allowing execution of the action when evaluated to true. For example, the action is conditioned to different hardware parameters of the endpoint (such as the CPU model or the RAM size), to the operating system installed thereon, and the like; comparison operators, Boolean operators, constants and variables are available to define the conditions. The ACTION class 205p further exposes a CAN_EXECUTE method, which makes it possible to verify whether the action can be performed on the endpoint; a DO_EXECUTE method is then used to perform the action. Both the CAN_EXECUTE method and the DO_EXECUTE method are called specifying either an EXECUTE operation (for carrying out the action) or a REVERSE operation (for undoing the action).

Actions with an installable object specifying an entity to be removed from the endpoint instantiate a REMOVE_OBJECT class 205r; the REMOVE_OBJECT class 205r extends the ACTION class 205p, so that it inherits all the attributes thereof. On the other hand, actions specifying an entity to be added to the endpoint instantiate an ADD_OBJECT class 205a, which extends the ACTION class 205p as well. The ADD_OBJECT class 205a exposes a series of attributes for the purpose of entity version control (whose values are set during creation of the package 205). For example, a REPLACE_IF_EXISTING attribute specifies that a pre-existing entity may be replaced, a REPLACE_IF_NEWER attribute specifies that only an old version of the entity may be replaced, and a REMOVE_IF_MODIFIED attribute specifies that a pre-existing entity must be removed when modified.

ADD_OBJECT and REMOVE_OBJECT classes 205a, 205r have an associated INSTALLABLE_OBJECT class 205o corresponding to the respective entity (to be added or to be removed). The INSTALLABLE_OBJECT class 205o exposes an attribute IS_SHARED, which is asserted when the entity can be shared among multiple packages.

Containers correspond with a CONTAINER class 205c, which extends the ACTION class 205p. The CONTAINER class 205c exposes a further attribute STOP_ON_FAILURE (whose value is set during the creation of the package); this attribute enables the result of an action to condition the execution of its child actions.

Referring back to FIG. 2a, a collection of modules 210 is used to prepare the package 205. In detail, the collection 210 includes an editor enabling an operator to define the package using a graphical interface. The package itself is defined as a first action; the operator is then prompted to enter, inter alias, name and version attributes of the package. Child actions are added from a menu of possible choices and their attributes are set through dialogue boxes.

Once the hierarchical structure of the package has been defined, the instruction section 205i of the package is generated; the instruction section 205i consists of a file (referred to as a software package file), which serializes the hierarchical structure into a binary representation. For this purpose, the editor traverses the hierarchical structure top-down and calls an ENCODE method associated with each action. The called methods generate a series of records, each one given a unique name identifying the corresponding class; the record contains the values set for the attributes of the class, the definition of the respective conditions, and the list of children depending thereon (if any).

Alternatively, the package is described with a plain text file (referred to as a software package definition file). The syntax of the text file is based on a sequence of stanzas, starting from a top-level stanza corresponding to the package. Each stanza represents an action; stanzas can be nested, with stanzas that contain other stanzas representing a container. A conversion module of the collection 210 generates the instruction section 205*i* by interpreting this text file with conventional parsing techniques.

The package 205 (referred to as a software package block) is built from the instruction section 205*i*. The package 205 consists of a compressed archive file, to which the instruction section 205*i* is added. The instruction section 205*i* is then decoded. For this purpose, the instruction section 205*i* is read, and the name assigned to each record is used to access a look-up table specifying the corresponding class; once the class has been instantiated, a DECODE method associated therewith is called. The called methods generate the corresponding hierarchical structure of the package. The hierarchical structure is then traversed, and a BUILD method is called on each class. These methods retrieve the entities to be installed on the endpoint from a repository 215 (for example, storing files, libraries, and the like); the retrieved entities are then added to the package 205.

The package 205 may be prepared in two different formats. In a BUILT format, entities to be installed on the endpoints are collected from the repository 215 and imported into the data section 205*d* of the package at the preparation time; in this way, the entities are frozen, so that all the endpoints receive the same copy of the package 205 at any time. Conversely, in a NON_BUILT format, the entities are collected only when the package must be distributed (so that different endpoints always receive the last version of each entity).

The NON_BUILT format is also used to distribute the package in a repair mode to endpoints that have already received the same package. This package (identified by a corresponding option flag) will cause each endpoint to traverse the corresponding hierarchical structure, in order to call a method on each class to verify whether the respective entities are correctly installed on the endpoint. A list of entities to be repaired (for example, because they are missing or they are of a wrong version) is generated and returned to the source host. The source host then builds a corresponding (delta) package for installing the correct entities on the endpoint. This technique is used to detect and repair inconsistencies in the endpoint, typically resulting from entities deleted or updated by a user of the endpoint (for example, by mistake or during installation of other software products). The same technique is also used only to distribute entities that have been modified since the last distribution process.

The collection 210 further includes a tool enabling automatic generation of the package 205. Particularly, the tool operates by taking a snapshot of a pristine workstation (or a selected portion thereof) corresponding to the endpoints to which the software products must be distributed. The software products are then installed on the workstation, and a new snapshot is taken. The tool detects the differences between the two snapshots, in order to generate the corresponding package 205. Preferably, the resulting instruction section 205*i* of the package is decoded and checked to look for unwanted actions and to build in conditions.

A communication service 220 provides an interface to access the packages 205. The service 220 is further coupled with a repair module 225, which controls building and distribution of the delta packages 205 in response to corresponding requests received from the endpoints.

A further communication service 230 residing on the endpoint manages the software distribution process. The service 230 communicates with an engine 235, which enforces the packages received from the source host on the endpoint. The engine 235 accesses a repository 237 storing a current hardware configuration of the endpoint; the configuration repository 237 includes a series of records, each one specifying the value of a corresponding hardware parameter (such as the CPU model, the RAM size, and the like). The engine 235 manages a log 240 of the software distribution process; the log 240 consists of a catalogue storing the definition of the actions and of the corresponding conditions for each package distributed to the endpoint; moreover, a flag is used to denote the evaluation result of each condition at the distribution time. The engine 235 further makes a back-up copy 245 of the entities updated or removed from the endpoint as a result of the distribution process.

A list 247*a* of actions for adding entities to the endpoint and a list 247*r* of actions for removing entities from the endpoint are generated by the engine 235 in response to a package distributed in the repair mode. The package catalogue 240 is further accessed by a monitor 250. The monitor 250 detects any change (resulting in a new configuration of the endpoint) through the configuration repository 237. Accordingly, the monitor 250 generates the list 247*a* of actions for adding entities now meeting the new configuration of the endpoint, and the list 247*r* of actions for removing entities not meeting the new configuration any longer. The add action list 247*a* and the remove action list 247*r* are notified to the source host (through the service 230), in order to trigger building of the corresponding delta package.

Similar considerations apply if the whole application and the corresponding data are structured in a different manner, if the package has another structure (for example, if the concept of per user action is supported), if equivalent software features are distributed (such as multimedia works), if different modules and functions are provided (for example, if the source host stores modules for testing the package on a disconnected computer); alternatively, the package is prepared in a different manner, the configuration repository and/or the package catalogue are replaced with equivalent memory structures, other parameters (either hardware or software) are used to define the configuration of the endpoint, the change in the configuration of the endpoint is detected in a different manner (for example, checking its configuration every time the endpoint is turned on), the add action list and the remove action list are replaced with equivalent information, and the like.

Figure 3A:
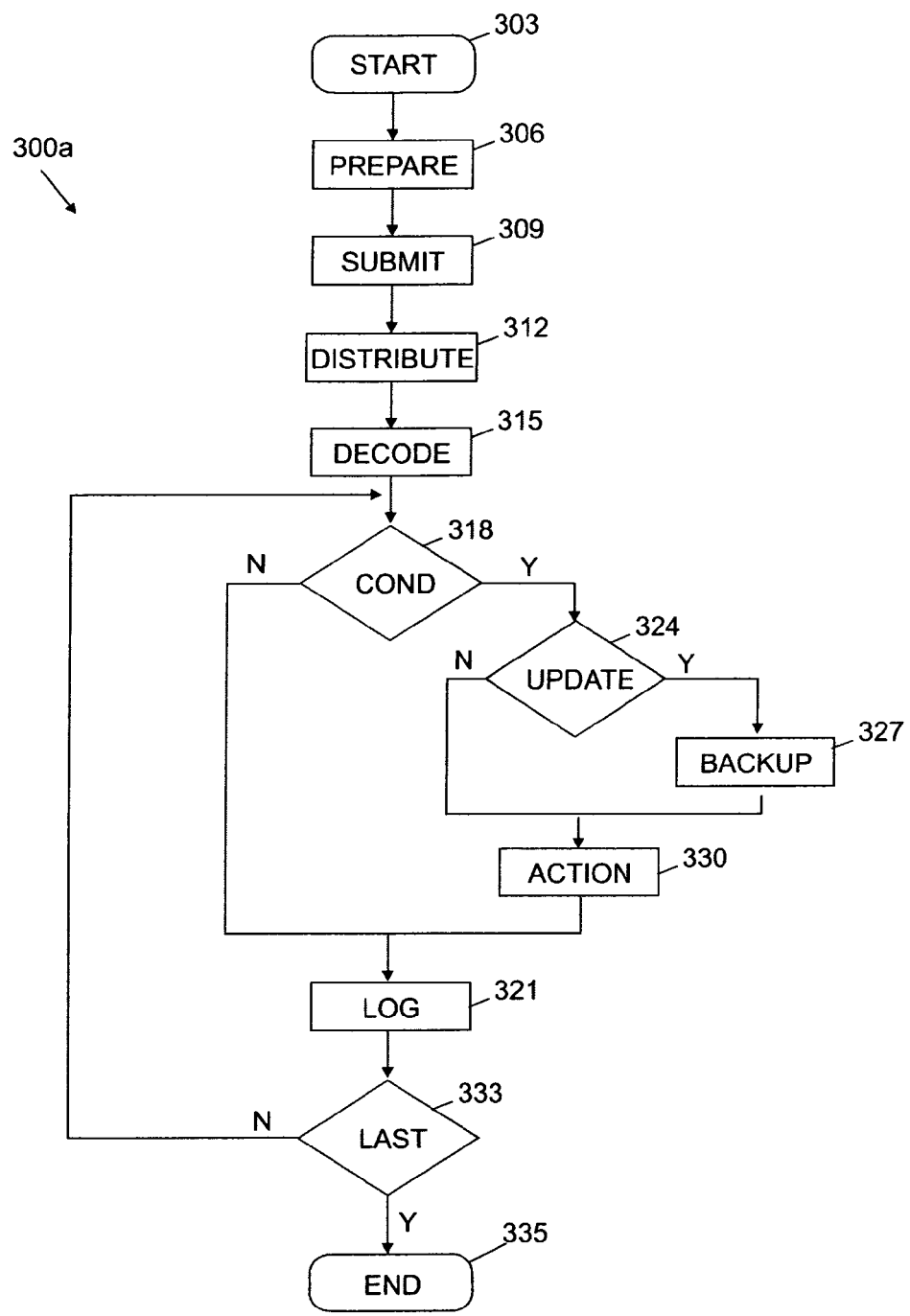
FIGS. 3a-3b are flowcharts describing the logic of different phases of the software distribution process.

Considering now FIG. 3*a*, the logic flow corresponding to the deployment of a package is represented with a method 300*a*, which starts at block 303. The package is prepared at block 306, by defining the actions to be carried out on the endpoints and the respective conditions; the entities to be installed on the endpoints are then embedded into the package. Moving to block 309, the operator submits a distribution request to the server. The distribution request is routed to the source host, which returns an identification code to the server enabling the operator to monitor and control the distribution process. Commands are available for allowing the operator to pause or to cancel the distribution process; additional commands enable the operator to request detailed reports after the distribution process completes.

With reference now to block 312, the package is transmitted to the endpoint. The distribution process takes place across a hierarchy of gateways before reaching the endpoint; the gateways operate as repeaters (or depots), wherein the package is loaded and stored. The engine on the endpoint is provided with a label of the package; the endpoint then opens a communication channel to the nearest gateway so as to download the package directly using a synchronous multiplexing technique. The instruction section of the package is the first file received by the endpoint; the instruction section is simultaneously read and decoded at block 315, in order to create the hierarchical structure of the package in the working memory of the endpoint.

The engine reads and traverses the hierarchical structure so obtained top-down (by calling a desired method on the instance of the package at the top of the hierarchy, which method in turn calls the same method on its children). For each action, the engine checks at block 318 whether the configuration of the endpoint meets the associated condition. If the action cannot be performed, the method descends into block 321 (described in the following). Conversely, if the configuration of the endpoint meets the condition associated with the action, the method passes to block 324. If the action involves the update of a pre-existing entity on the endpoint (for example, the erasing or the replacing of a file), a back-up copy of the entity is performed at block 327; the method then continues to block 330. Conversely (for example, when the action involves the adding of a new file), the method descends into block 330 directly.

The action is carried out at block 330; if the action specifies an installable object, the entity is added to or is removed from the endpoint. If the entity is shared among multiple packages, the engine associates a counter with the entity to indicate how many packages are using the entity. The adding of a shared entity increases the counter, whereas its removal decreases the counter; the entity is physically removed from the endpoint only when the counter becomes zero (that is, no more packages are using the entity). The method then passes to block 321.

Considering now block 321, the action with the respective condition and the result of its evaluation are logged in the package catalogue. A test is made at block 333 to determine whether the last action of the package has been processed. If not, the method returns to block 318 for verifying and possibly executing a next action. Conversely, when the last action of the package has been processed the distribution process ends at the final block 335.

Figure 3B:
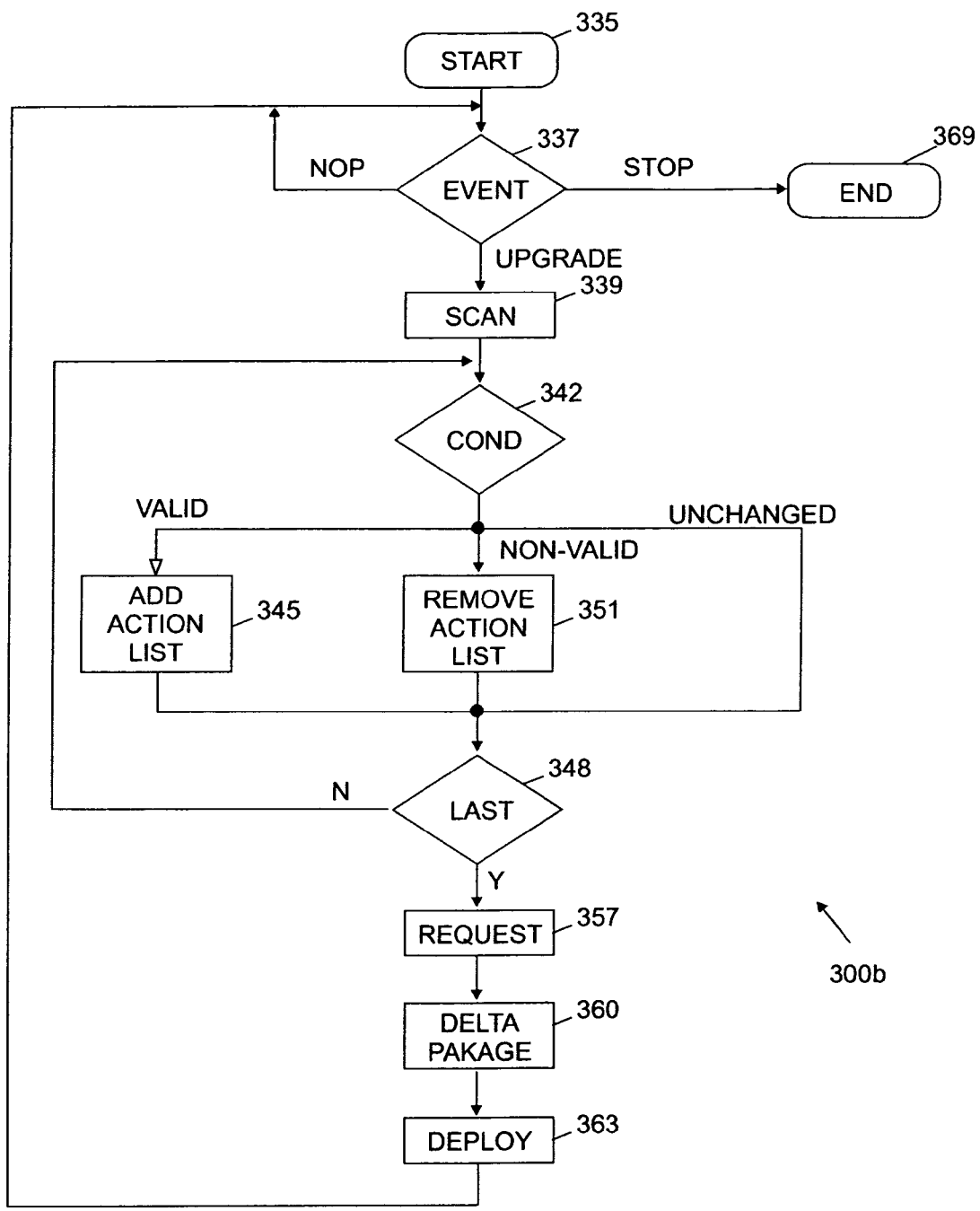

Moving now to FIG. 3*b*, the monitor running on the endpoint performs a further method 300*b* that starts at block 336. The monitor loops at block 337 waiting for an event to occur. Whenever a change in the configuration of the endpoint is detected, the steps 339-363 are performed; conversely, if the endpoint has been shutdown, the method ends at the final block 369.

Considering now block 339, occurrence of any change resulting in a new configuration of the endpoint (such as a hardware upgrade) is recorded in the respective repository; this causes the monitor to detect the change in a list of hardware parameters and related new values. In response thereto, the monitor triggers a scan of the package catalogue so as to identify all the actions having conditions based on one or more hardware parameters modified by the upgrade.

For each of these actions, the corresponding condition is evaluated again at block 342. If the condition has become valid in the new configuration, the action is inserted into the add action list at block 345, and the method then passes to block 348 (described in the following). If the condition is no longer valid in the new configuration, the action is inserted into the remove action list at block 351, and the method then continues to block 348. If the result of the evaluation is unchanged (that is, the condition remains either valid or non-valid), the method descends into block 348 directly. A test is made at decision block 348 to determine whether the last action has been processed. If not, the method returns to block 342 for evaluating the condition associated with a next action.

As soon as all the actions have been processed, the method descends into block 357, wherein the add action list and the remove action list are notified to the source host. In response thereto, the corresponding delta package is built at block 360. The instruction section of the delta package specifies the installation of the entities required by the actions of the add action list, and the undoing of the actions of the remove action list; the data section of the delta package embeds the entities (identified by the add action list) to be installed on the endpoint. With reference now to block 363, the delta package is distributed to the endpoint (repeating the operations described above). As a result, the entities associated with the add action list are installed on the endpoint; at the same time, the entities associated with the remove action list are deleted (if they had been added to the endpoint), or they are restored from their back-up copies (if they had been removed or replaced with different versions). The method then returns to block 337 waiting for a new event to occur.

For example, let us consider the distribution of a package specifying the following actions with the respective conditions:

Action_1: Add File_1 if CPU=Model_1
Action_2: Remove File_2 if RAM≦64 Mbytes
Action_3: Add File_3 if RAM≦64 Mbytes
Action_4: Add File_4 if RAM>64 Mbytes Assuming that the package is distributed to an endpoint having a CPU different from Model_1 and a RAM of 32 Mbytes, only the conditions associated with Action_2 and Action_3 are true. Therefore, the engine removes File_2 from the endpoint (after making a back-up copy) and then installs File_3 (while File_1 and File_4 are not even transferred to the endpoint).

A hardware upgrade is carried out on the endpoint; the upgrade involves the installation of a new CPU of the Model_1 type and the installation of some memory modules bringing the RAM size to 128 Mbytes. These changes make the conditions of Action_1 and Action_4 valid, whereas the conditions of Action_2 and Action_3 are not valid any longer. In response thereto, a request for executing Action_1, Action_4 and for undoing Action_2, Action_3 is transmitted to the source host. The source host accordingly builds the corresponding delta package, which is then distributed to the endpoint. As a consequence, File_2 is restored (from its back-up copy) and File_3 is removed; at the same time, File_1 and File_4 are received and installed on the endpoint.

Similar considerations apply if equivalent methods are performed (for example, with checkpoints that are regularly written during the software distribution process so as to enable restarting after a failure or rebooting of the endpoint), if the package is deployed with a different technique, if the package is distributed in a transactional mode (with each action that is first prepared and then committed so as to enable a rollback to a consistent situation if something goes wrong during the prepare phase), and the like.

More generally, the present invention proposes a software distribution method. The method starts with the step (carried out on a source computer) of providing a package including an indication of actions to be performed on each one of a plurality of target computers for enforcing corresponding software features; one or more of the actions are conditioned to a configuration of the target computer. The package is transmitted from the source computer to the target computer, and the actions meeting the configuration of the target computer are performed. In the method of the invention, a change resulting in a new configuration of the target computer is detected. Correction actions for enforcing the software features meeting the new configuration are determined; the correction actions are then performed.

The proposed solution is based on a model supporting cooperation between the source computer and the target computers.

The method of the invention avoids inconsistencies in the target computers.

Particularly, the devised solution ensures that operation of the target computer is not impaired by software features incompatible with its configuration.

The method of the invention is particularly advantageous in high dynamic environments (wherein the configuration of the target computers changes frequently), even if its use in different applications is not excluded.

The preferred embodiment of the invention described above offers further advantages.

Particularly, each package distributed to the endpoint is scanned in order to identify all the conditions affected by the change in its configuration; these conditions are evaluated again, and the corresponding actions now meeting the new configuration of the endpoint are performed.

In this way, the correction actions are determined in a very simple manner, without requiring all the conditions of the package to be evaluated again.

Preferably, all the actions and the conditions of the package are logged in the package catalogue, together with the corresponding results of the evaluation at the distribution time.

The devised solution improves the effectiveness of the software distribution process.

Advantageously, the entities to be installed on the endpoint for the new configuration are requested to the source host.

The proposed feature avoids wastage of memory space on the endpoint.

However, the solution of the invention leads itself to be carried out even defining the conditions in a different manner, evaluating all the conditions of each package in the new configuration, logging different information, storing the whole package on the endpoint, determining the actions to be performed under the control of the source host, and the like.

Preferably, the correction actions further specify the undoing of the performed actions not meeting the new configuration of the endpoint any longer.

This additional step enables restoration of a consistent condition on the endpoint (with all the entities needed by the new configuration).

As a further improvement, entities affected by the performed actions are restored from their back-up copies.

Therefore, any entity deleted or updated during the distribution process can be restored to its original version.

Alternatively, the actions are undone without requiring any back-up copy, the back-up copies are stored elsewhere, the entities cannot be restored, or the actions are not performed in an undoable manner.

In a preferred embodiment of the present invention, the add action list and the remove action list are transmitted to the source host, which accordingly builds the delta package for causing execution of the corresponding correction actions.

The proposed solution provides a central control of any action carried out on the endpoint. The use of the delta package makes it possible to prevent any inconsistency in the endpoint (ensuring that all the actions of both the add action list and the remove action list are performed). Moreover, this feature may be implemented exploiting the repair module already available on the source host.

However, the method of the invention is also suitable to be carried out performing the correction actions in a different way, undoing the actions of the remove action list directly on the endpoint, and even providing a dedicated module on the source host for building the delta package.

Advantageously, the solution according to the present invention is implemented with a computer program application, which is provided on CD-ROM.

The application has a client-server architecture; particularly, the application consists of a program installed on the source host and a program installed on each endpoint. Moreover, it should be noted that the program on the endpoint is suitable to be implemented separately and put on the market even as a stand-alone product.

Alternatively, the programs are provided on floppy-disks, are pre-loaded onto the hard-disks, or are stored on any other computer readable medium, are sent to the computers through a network (typically the INTERNET), are broadcast, or more generally are provided in any other form directly loadable into the working memories of the computers. However, the method according to the present invention leads itself to be carried out with an application having a different architecture, or even with a hardware structure (for example, integrated in one or more chips of semiconductor material).

Naturally, in order to satisfy local and specific requirements, a person skilled in the art may apply to the solution described above many modifications and alterations all of which, however, are included within the scope of protection of the invention as defined by the following claims.

The invention claimed is:

1. A software distribution method including the steps of:
   on a source computer providing a package including an indication of actions to be performed on each one of a plurality of target computers for enforcing corresponding software features, at least one of the actions being conditioned to a configuration of the target computer,
   transmitting the package from the source computer to the target computer,
   performing the actions meeting the configuration of the target computer,
   detecting a change resulting in a new configuration of the target computer,
   determining correction actions for enforcing the software features meeting the new configuration, and
   performing the correction actions, wherein the step of performing the correction actions includes:
   transmitting an indication of the correction actions to the source computer, building a further package for causing execution of the correction actions on the target computer, and
   transmitting the further package to the target computer.

2. A program application product comprising a computer readable medium on which a computer program application is stored, the computer program application being directly loadable into a working memory of a data processing system for performing a software distribution method when the application is run on the data processing system, wherein the method includes the steps of:
   on a source computer providing a package including an indication of actions to be performed on each one of a plurality of target computers for enforcing corresponding software features, at least one of the actions being conditioned to a configuration of the target computer,
   transmitting the package from the source computer to the target computer,
   performing the actions meeting the configuration of the target computer, detecting a change resulting in a new configuration of the target computer, determining correction actions for enforcing the software features meeting the new configuration, and performing the correction actions, wherein the package further includes an indication of at least one condition based on at least one configuration parameter of the target computer, each condition being associated with at least one action, and wherein the step of performing the actions meeting the configuration of the target computer includes: performing a first evaluation of each condition according to the configuration of the target computer, and performing the at least one action associated with the condition when a corresponding result of the first evaluation is met by the target computer, and the step of determining the correction actions includes: identifying the conditions based on at least one configuration parameter affected by the change, performing a second evaluation of each identified condition according to the new configuration, and selecting the at least one action associated with the identified condition when the corresponding result of the first evaluation is not met by the target computer and the corresponding result of the second evaluation is met by the target computer.

3. A program product comprising a computer readable medium on which a computer program is stored, the computer program being directly loadable into a working memory of a target computer for performing a software distribution method when the program is run on the target computer, wherein the target computer is coupled with a source computer providing a package including an indication of actions to be performed on the target computer for enforcing corresponding software features and wherein at least one of the actions is conditioned to a configuration of the target computer, the method including the steps of:

receiving the package from the source computer, performing the actions meeting the configuration of the target computer, detecting a change resulting in a new configuration of the target computer, determining correction actions for enforcing the software features meeting the new configuration, and performing the correction actions, wherein the step of performing the correction actions includes:

transmitting an indication of the correction actions to the source computer, and receiving a further package at the target computer, the further package having been built by the source computer, in response to the source computer receiving the indication of the correction actions, for causing execution of the correction actions on the target computer.

4. A software distribution system including a source computer and a plurality of target computers, the source computer having a software module for providing a package including an indication of actions to be performed on each one of the target computers for enforcing corresponding software features, at least one of the actions being conditioned to a configuration of the target computer, wherein the system further includes network services for transmitting the package from the source computer to the target computer and wherein the target computer includes an engine for performing the actions meeting the configuration of the target computer, and a monitor for detecting a change resulting in a new configuration of the target computer and for determining correction actions for enforcing the software features meeting the new configuration, the engine being further suitable to perform the correction actions by transmitting an indication of the correction actions to the source computer, wherein the source module of the source computer builds a further package for causing execution of the correction actions on the target computer and transmits the further package to the target computer.

* * * * *